(12) United States Patent
Kanatzidis et al.

(10) Patent No.: US 11,932,952 B2
(45) Date of Patent: Mar. 19, 2024

(54) COMPOSITE, HIERARCHICAL ELECTROCATALYTIC MATERIALS FOR WATER SPLITTING

(71) Applicant: Northwestern University, Evanston, IL (US)

(72) Inventors: Mercouri G. Kanatzidis, Wilmette, IL (US); Shulan Ma, Beijing (CN)

(73) Assignee: Northwestern University, Evanston, IL (US)

( * ) Notice: Subject to any disclaimer, the term of this patent is extended or adjusted under 35 U.S.C. 154(b) by 476 days.

(21) Appl. No.: 17/289,046

(22) PCT Filed: Oct. 28, 2019

(86) PCT No.: PCT/US2019/058252
§ 371 (c)(1),
(2) Date: Apr. 27, 2021

(87) PCT Pub. No.: WO2020/092188
PCT Pub. Date: May 7, 2020

(65) Prior Publication Data
US 2021/0404073 A1 Dec. 30, 2021

Related U.S. Application Data

(60) Provisional application No. 62/751,907, filed on Oct. 29, 2018.

(51) Int. Cl.
*C25B 11/052* (2021.01)
*C25B 1/04* (2021.01)
(Continued)

(52) U.S. Cl.
CPC .............. *C25B 11/052* (2021.01); *C25B 1/04* (2013.01); *C25B 9/17* (2021.01); *C25B 11/031* (2021.01); *C25B 11/061* (2021.01); *C25B 11/091* (2021.01)

(58) Field of Classification Search
None
See application file for complete search history.

(56) References Cited

U.S. PATENT DOCUMENTS

2018/0166223 A1 6/2018 Jung et al.

FOREIGN PATENT DOCUMENTS

CN 108816250 A 11/2018

OTHER PUBLICATIONS

Zhang et al, RCA Adv., 2017, vo. 7, p. 46286 (Year: 2017).*
(Continued)

*Primary Examiner* — Louis J Rufo
(74) *Attorney, Agent, or Firm* — Bell & Manning, LLC

(57) ABSTRACT

Composite electrocatalytic materials for catalyzing water splitting are provided. Such materials may comprise a porous, conductive support composed of a transition metal foam, the support having a surface, and a coating on the surface of the support. The coating may comprise nanorods of a first transition metal chalcogenide, each nanorod anchored on one end to the surface of the support and extending perpendicularly away from the surface of the support to a free opposing end, nanosheets of a second transition metal chalcogenide, the nanosheets coating a surface of the nanorods of the first transition metal chalcogenide, and nanosheets of a third transition metal chalcogenide, the nanosheets also coating the surface of the nanorods of the first transition metal chalcogenide.

19 Claims, 3 Drawing Sheets

(51) Int. Cl.
　　　C25B 9/17　　　(2021.01)
　　　C25B 11/031　　(2021.01)
　　　C25B 11/061　　(2021.01)
　　　C25B 11/091　　(2021.01)

(56) References Cited

OTHER PUBLICATIONS

Han et al, Journal of Physics and Chemistry of Solids, vol. 110, Nov. 2017, p. 1-8 (Year: 2017).*

Yuan et al, Energy Environ. Sci., 2012, 5, 7883 (Year: 2012).*

Xiong, X., Zhao, B., Ding, D et al, "One-step synthesis of architectural Ni3S2 nanosheet-on-nanorods array for use as high-performance electrodes for supercapacitors". NPG Asia Mater 8, e300 (2016). https://doi.org/10.1038/am.2016.126_ (Year: 2016).*

The International Search Report and the Written Opinion dated Jan. 22, 2020 for International Patent Application No. PCT/US19/58252; pp. 1-8.

Lv, Y. et al., "Construction of hierarchical zinc cobalt sulfide@nickel sulfide core-shell nanosheet arrays for high-performance asymmetric solid-state supercapacitors," *Chemical Engineering Journal*, (2018), vol. 349; pp. 397-407.

Zhang, N. et al., "MoS2/Ni3S2 nanorod arrays well-aligned on Ni foam: a 3D hierarchical efficient bifunctional catalytic electrode for overall water splitting," *RSC Adv.*, 2017, vol. 7, 46286.

Yang, Y. et al., "Hierarchical Nanoassembly of MoS2/Co9S8/Ni3S2/Ni as a Highly Efficient Electrocatalyst for Overall Water Splitting in a Wide pH Range," *J. Am. Chem. Soc.*, 2019, vol. 141; pp. 10417-10430.

Liang-Liang Feng et al., "High-Index Faceted Ni3S2 Nanosheet Arrays as Highly Active and Ultrastable Electrocatalysts for Water Splitting," *Journal of the American Chemical Society*, 2015, vol. 137; pp. 14023-14026.

Minghao Zhuang et al., "Polymer-Embedded Fabrication of Co2P Nanoparticles Encapsulated in N, P-Doped Graphene for Hydrogen Generation," *Nano Lett.*, 2016, vol. 16; pp. 4691-4698.

Ying Zhang et al., "Cobalt-molybdenum nanosheet arrays as highly efficient and stable earth-abundant electrocatalysts for overall water splitting," *Nano Energy*, (2018), vol. 45; pp. 448-455.

Jian Zhang et al., "Interface Engineering of MoS2/Ni3S2 Heterostructures for Highly Enhanced Electrochemical Overall-Water-Splitting Activity," *Angew. Chem. Int. Ed.*, 2016, vol. 55; pp. 6702-6707.

Cuicui Du et al., "Hierarchical MoP/Ni2P heterostructures on nickel foam for efficient water splitting†," *J. Mater. Chem. A.*, 2017, vol. 5, 15940.

Ali Han et al., "Ternary metal phosphide nanosheets as a highly efficient electrocatalyst for water reduction to hydrogen over a wide pH range from 0 to 14†," *J. Mater. Chem. A.*, 2016, vol. 4, 10195.

Davide Ansovini et al., "A highly active hydrogen evolution electrocatalyst based on a cobalt-nickel sulfide composite electrodet," *J. Mater. Chem. A*, 2016, vol. 4, 9744.

Yuanyuan Wu et al., "Efficient electrocatalysis of overall water splitting by ultrasmall NixCo3-xS4 coupled Ni3S2 nanosheet arrays," *Nano Energy*, 2017, vol. 35; pp. 161-170.

Yung-Huang Chang et al., "Highly Efficient Electrocatalytic Hydrogen Production by MoS x Grown on Graphene-Protected 3D Ni Foams," *Adv. Mater.*, 2013, vol. 25; pp. 756-760.

Yan Yang et al., "Hierarchical Nanoassembly of MoS2/Co9S8/Ni3S2/Ni as a Highly Efficient Electrocatalyst for Overall Water Splitting in a Wide pH Range," *J. Am. Chem. Soc.*, 2019, vol. 141; pp. 10417-10430.

* cited by examiner

COMPOSITE, HIERARCHICAL ELECTROCATALYTIC MATERIALS FOR WATER SPLITTING

CROSS-REFERENCE TO RELATED APPLICATIONS

This application is a National Stage of International Application No. PCT/US19/58252, filed Oct. 28, 2019, which claims the benefit of U.S. Patent Application No. 62/751,907, filed Oct. 29, 2018, the contents of which are herein incorporated by reference.

BACKGROUND

Hydrogen energy, as an alternative to conventional fossil fuels, is a long-standing goal which, if achieved, will have a profound impact on all aspects of energy utilization. Electrochemical water splitting can provide a clean and appealing pathway to generate pure hydrogen if performed efficiently. In general, water electrolysis proceeds via two half-cell reactions: anodic oxygen evolution reaction (OER) and cathodic hydrogen evolution reaction (HER). Due to the unfavorable thermodynamics and sluggish kinetics of both OER and HER, highly efficient electrocatalysts need to be developed in order to reduce the large overpotentials and accelerate the reaction rate. Noble metals and their compounds are known as the most efficient catalysts for HER (Pt-based materials) and OER (Ru- or Ir-based oxides), but broad commercial application of these materials is hindered by the scarcity and high price. Decades of research in developing ideal noble-metal free catalysts have shown how challenging it is to find stable electrocatalysts to accomplish efficient HER or OER. Generally, efforts are focused on different materials for HER and OER, respectively. In order to realize overall water splitting in practical applications, bifunctional electrocatalysts, meaning catalysts that can enable both HER and OER in the same electrolyte, are preferable, since they can simplify the operating system. However, designing earth-abundant, low-cost, and efficient dual use electrocatalysts for overall water splitting is quite challenging.

Water electrolysis for industrial applications is mainly performed in basic solution. A great number of non-noble metal (such as Co, Ni, Mn, Fe, Mo, and W) based materials have been investigated as bifunctional electrocatalysts for water splitting in alkaline media. Compared with alkaline electrolysis, electrolysis in acids sometimes has the advantages of simplicity and high-current density, and acid electrolysis can expand the application scope of water splitting. However, only a few non-noble metal catalysts (such as NC—CNT/CoP, Co—$MoS_2$) have been studied for water splitting in acid electrolytes, and their overpotentials have been found to be large and their working stability poor. Hence, efficient electrocatalysts in acid are still limited to noble metals. However, the extreme pH operating conditions in acid and alkali often cause serious stability problems in the catalysts as well as corrosion problems in the devices, limiting the types of cell components and electrodes. In the long term, splitting of river or ocean water in neutral pH is an ultimate goal for sustainable $H_2$ production. In neutral media, some electrocatalysts, such as $Co_3S_4$ nanosheets, $Li_2Co_2O_4$, and $Li_2MnP_2O_7$, have been studied for OER reactions, but they suffer from large overpotentials. For overall water splitting in neutral media, investigations on bifunctional electrocatalysts (that can catalyze both HER and OER) are rare. Considering the respective advantage in alkaline, acidic, and neutral media, the development of bifunctional water splitting electrocatalysts that can be performed in universal pH is highly desirable.

SUMMARY

Provided are composite electrocatalytic materials for water splitting and electrodes and electrocatalytic systems which include the materials.

Composite electrocatalytic materials for catalyzing water splitting are provided. In an embodiment, such a material comprises a porous, conductive support composed of a transition metal foam, the support having a surface, and a coating on the surface of the support. The coating comprises nanorods of a first transition metal chalcogenide, each nanorod anchored on one end to the surface of the support and extending perpendicularly away from the surface of the support to a free opposing end, nanosheets of a second transition metal chalcogenide, the nanosheets coating a surface of the nanorods of the first transition metal chalcogenide, and nanosheets of a third transition metal chalcogenide, the nanosheets also coating the surface of the nanorods of the first transition metal chalcogenide.

Electrocatalytic systems for catalyzing water splitting are also provide. In embodiments, such a system comprises an electrochemical cell configured to contain water, an electrode comprising the material described above in contact with the water, a counter electrode in electrical communication with the electrode, and a power source in electrical communication with the electrode and the counter electrode and configured to apply an electrical potential across the electrode and the counter electrode.

Methods of making the material described above are also provided. In an embodiment, such a method comprises exposing the porous, conductive support to an aqueous solution comprising a first precursor comprising a chalcogen, a second precursor comprising a first transition metal, and a third precursor comprising a second transition metal at an elevated temperature, under pressure, and for a period of time to induce chemical reactions of the first precursor with the support to form the nanorods of the first transition metal chalcogenide, chemical reactions of the first precursor with the second precursor to form the nanosheets of the second transition metal chalcogenide, and chemical reactions of the first precursor with the third precursor to form the nanosheets of the third transition metal chalcogenide.

Methods of using the system described above are also provided. In an embodiment, such a method comprises applying the electrical potential across the electrode and the counter electrode to induce an oxidation reaction at the electrode to produce $O_2$ or a reduction reaction at the electrode to produce Hz.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
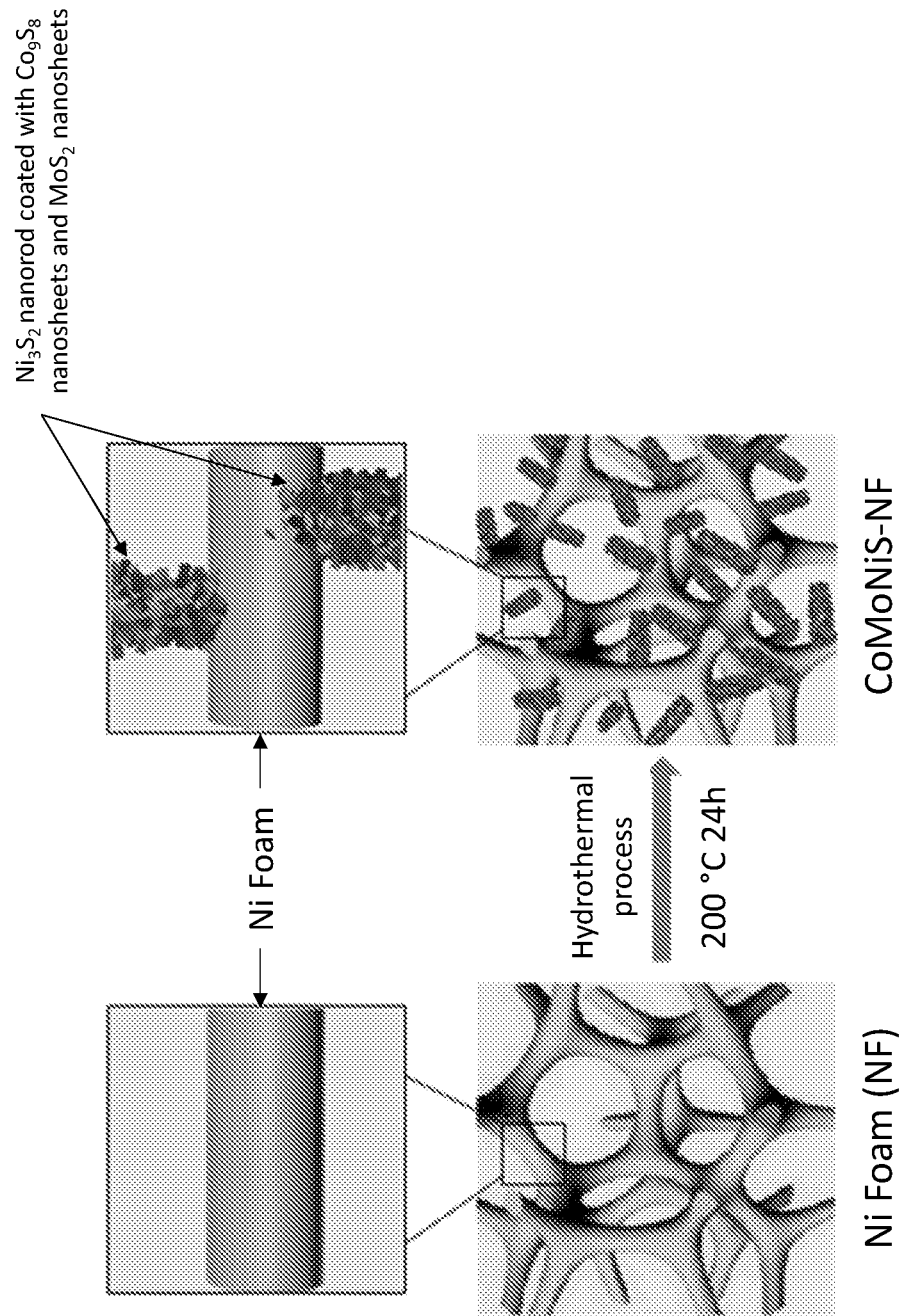
FIG. 1 is a schematic illustration of the synthesis and growth of the hierarchical $MoS_2/Co_9S_8/Ni_3S_2$/NF composite via a facile one-pot hydrothermal method.

Provided are composite electrocatalytic materials and electrodes and electrocatalytic systems which include the materials. Also provided are methods for making and using the electrocatalytic materials. The electrocatalytic materials are heterogeneous and hierarchical both in terms of their chemical and physical structures. This provides at least some embodiments of the materials with superior electrocatalytic properties, including the ability to efficiently catalyze both the OER and the HER, regardless of the pH of the electrolyte solution in which the reactions are conducted. As a result, such materials have earned the rare designation of being highly active, pH universal, bifunctional electrocatalytic materials, including for use in overall water splitting. The phrase "water splitting" as used in the present disclosure can refer to one of the two half reactions, i.e., one of the OER and the HER. The phrase "overall water splitting" as used in the present disclosure can refer to both of the half reactions.

In one aspect, composite electrocatalytic materials are provided. In an embodiment, such an electrocatalytic material comprises a porous, conductive support; nanostructures of a first type extending from a surface of the support; nanostructures of a second type coating a surface of the nanostructures of the first type; and nanostructures of a third type coating the surface of the nanostructures of the first type.

The porous, conductive support provides a three-dimensional, sponge-like, web-like matrix which defines a plurality of pores distributed throughout the matrix. (See FIG. 1 (Ni Foam (NF)).) The distribution of the pores is uniform throughout the matrix. Although pore cross-sections may be characterized as being circular, this term encompasses elliptical and irregularly shaped pores. The pores are interconnected such that in three-dimensions, the matrix defines elongated, tortuous channels distributed throughout the matrix. The average diameter of the pores may be in the range of from about 1 µm to about 1 mm. The porosity of the support may be in the range of from about 75% to about 95%. Porosity may be measured using mercury intrusion porosimetry. The support is composed of a conductive material, e.g., a metal. The particular metal depends upon the electrochemical reaction to be catalyzed. A variety of transition metals may be used, e.g., Ni, Cu, Ti. The porous, conductive support may be referred to as a metal foam. Commercially available metal foams may be used for the porous, conductive support.

In the present electrocatalytic materials, nanostructures of a first type extend from a surface of the porous, conductive support. These nanostructures may be characterized by their shape and dimensions. The nanostructures of the first type may be elongated, one-dimensional nanostructures having two dimensions which are on the order of nanometers, (i.e., in the range of from about 1 nm to about 1000 nm) and a third dimension which is significantly greater. In embodiments, the two nanoscale dimensions are of similar magnitude and the nanostructures may be referred to as nanorods. Nanorods may be characterized by an average diameter in the range of from about 100 nm to about 1000 nm. This includes average diameters in the range of from about 200 nm to about 800 nm, and from about 300 nm to about 600 nm. As with the shape of the pores of the support as described above, the term "diameter" is not meant to connote a perfectly spherical cross-section. Irregular, elliptical, circular, square, or rectangular cross-sections may be used. However, if the two nanoscale dimensions deviate from being of similar magnitude, such nanostructures may be referred to as nanobelts. In embodiments, the nanostructures are composed of nanorods, rather than nanobelts. Elongated, one-dimensional nanostructures may have an average length in the range of from about 1 µm to about 5 µm. This includes average lengths in the range of from about 1 µm to about 4 µm and about 2 µm to about 3 µm.

As shown in FIG. 1, elongated nanostructures of the first type may extend perpendicularly away from the surface of the porous, conductive support such that one end is anchored on the support and the opposite end is free. The term "perpendicularly" encompasses perpendicular and approximately perpendicular configurations (e.g., within 20° of perpendicular). As such, neighboring elongated nanostructures are approximately vertically aligned with one another. The distribution on the surface of the support may be approximately uniform. The nanostructures may be densely packed on the surface of the support, although this may be tuned depending upon the amount of the precursors used in the method of making the present composite electrocatalytic materials (further described below). The dense packing may be such that the elongated nanostructures form a continuous coating on the surface of the porous, conductive support, exposing little to none of the underlying surface of the support. For clarity, the schematic of FIG. 1 shows much less densely packed $Ni_3S_2$ nanorods projecting from a surface of Ni foam. However, as described in the Examples, below, SEM images of electrocatalytic materials formed using the method illustrated in FIG. 1 show the formation of a continuous coating of vertically aligned $Ni_3S_2$ nanorods extending perpendicularly away from the surface of the Ni foam.

Nanostructures of both a second type and a third type are coated on surfaces of the nanostructures of the first type. The nanostructures of the second and third types may also be characterized by their shape and dimensions. The nanostructures of the second and third types may be planar, two-dimensional nanostructures having one dimension which is on the order of nanometers, (i.e., in the range of from about 1 nm to about 1000 nm) and the other two dimensions which are significantly greater. The nanoscale dimension may be referred to as a thickness. The average thickness of the two-dimensional nanostructures may be quite small, e.g., no greater than 5 nm or in the range of 2 nm to 5 nm. The other two dimensions may be of similar magnitude, although the overall shape defined by these other two dimensions is not particularly limited. These other two dimensions may be on the order of from about 100 nm to about 400 nm, including from about 200 nm to about 300 nm. The two-dimensional nanostructures may be referred to as nanosheets.

As shown in FIG. 1, the planar nanostructures of the second and third types assemble together to effectively form a coating on the first type of nanostructures. Planar nanostructures of the second and third types may extend perpendicularly away from the surface of the first type of nanostructures such that one end or side is anchored on the first type of nanostructure and the opposite end/side is free. As such, neighboring planar nanostructures may have approximately vertically aligned longitudinal axes. The term "perpendicularly" has a meaning analogous to that described above. The average thickness of the coating of the planar nanostructures may also be quite small, e.g., no greater than about 400 nm, no greater than about 300 nm, no greater than about 200 nm, or in the range of from about 100 nm to about 400 nm. The distribution on the surfaces of the nanostructures of the first type may be approximately uniform. The nanostructures of the second and third types may densely cover the surfaces of the nanostructures of the first type so that the coating may be characterized as being continuous, exposing little to none of the underlying surfaces of the nanostructures of the first type. Again, SEM images of electrocatalytic materials formed using the method illustrated in FIG. 1 show the formation of a continuous coating of vertically aligned $Co_9S_8$ and $MoS_2$ nanosheets extending from the surface of the $Ni_3S_2$ nanorods. There is generally little to no coverage of the $Co_9S_8/MoS_2$ nanosheets on the Ni foam itself. However, the coverage may be tuned depending upon the amount of the precursors used in the method of making the present composite electrocatalytic materials (further described below).

The nanostructures of the first, second and third types have different compositions from one another. The particular composition depends upon the electrochemical reaction to be catalyzed. Transition metal chalcogenides may be used, particularly for catalyzing the HER and the OER. Illustrative transition metal chalcogenides include those comprising transition metals such as Ni, Mo, W, Co, Fe, and those comprising chalcogens such as S, Se, Te. In some embodiments, the first, second and third types of nanostructures are composed of different transition metal sulfides. The transition metal of the first type of nanostructure (which extends from the surface of the conductive, porous support) may be the same as the metal of the support. The chemical composition of the composite electrocatalytic materials may be referred to as M"M'M-Ch-MF-xy, wherein MF represents a metal foam (porous, conductive) support, M represents the transition metal of the first type of nanostructure; M' represents the transition metal of the second type of nanostructure; M" represents the transition metal of the third type of nanostructure; Ch represents the chalcogen; and x and y represent the relative mole ratio of the transition metals of the third and second types of nanostructures, respectively. The particular transition metal chalcogenide (i.e., chemical formula) for each of the types of the nanostructures and the particular x and y depends upon the choice of, and relative amounts of, the precursors used in the method of making the present composite electrocatalytic materials (further described below). The values of x and y may be adjusted to provide a desired, e.g., maximum, electrocatalytic activity. Illustrative transition metal chalcogenides and values of x and y are provided in the Example, below.

The composition and phase (which may be highly crystalline) of the first, second, and third types of nanostructures may be determined/confirmed using high-resolution transmission electron microscopy (HRTEM) and X-ray photoelectron spectroscopy (XPS) as described in the Example, below. The XPS technique may also be used to confirm an association of the second and third types of nanostructures (the nanostructures coating the first type of nanostructure) which is sufficient to allow for electron transfer between these two types of nanostructures. Such an association is characteristic of at least some embodiments of the present composite electrocatalytic materials. These results are described in the Example, below. Specifically, the existence of electron transfer, and thus, the physical association, may be confirmed through XPS by identifying an upshift in an orbital binding energy from one of M" and M' and a corresponding downshift in an orbital binding energy from the other of M" and M'.

Methods of making the composite electrocatalytic materials are also provided. In embodiments, such a method comprises exposing the porous, conductive support to an aqueous solution comprising a first precursor, a second precursor, and a third precursor at an elevated temperature, under pressure, and for a period of time. These conditions are selected to induce chemical reactions involving the first precursor with the support to form nanostructures of the first type on the surface of the support, chemical reactions involving the first precursor with the second precursor to form nanostructures of the second type on the surface of the nanostructures of the first type, and chemical reactions involving the first precursor with the third precursor to form nanostructures of the third type on the surface of the nanostructures of the first type. The first, second and third precursors depend upon the desired compositions for the nanostructures. However, for transition metal chalcogenides, the first precursor comprises a source of a chalcogen (e.g., thiourea for a source of S); the second precursor comprises a source of the transition metal of the nanostructure of the second type; and the third precursor comprises a source of the transition metal of the nanostructure of the third type. Transition metal salts are suitable second and third precursors. The porous, conductive support may provide a source of the transition metal of the nanostructure of the first type. The molar ratios of the second and third precursors may be used to tune the molar ratio of the second and third transition metals in the composite electrocatalytic material. Illustrative temperatures, times, precursors and molar ratios are provided in the Example, below. The method may be carried out in an autoclave.

Figure 3:
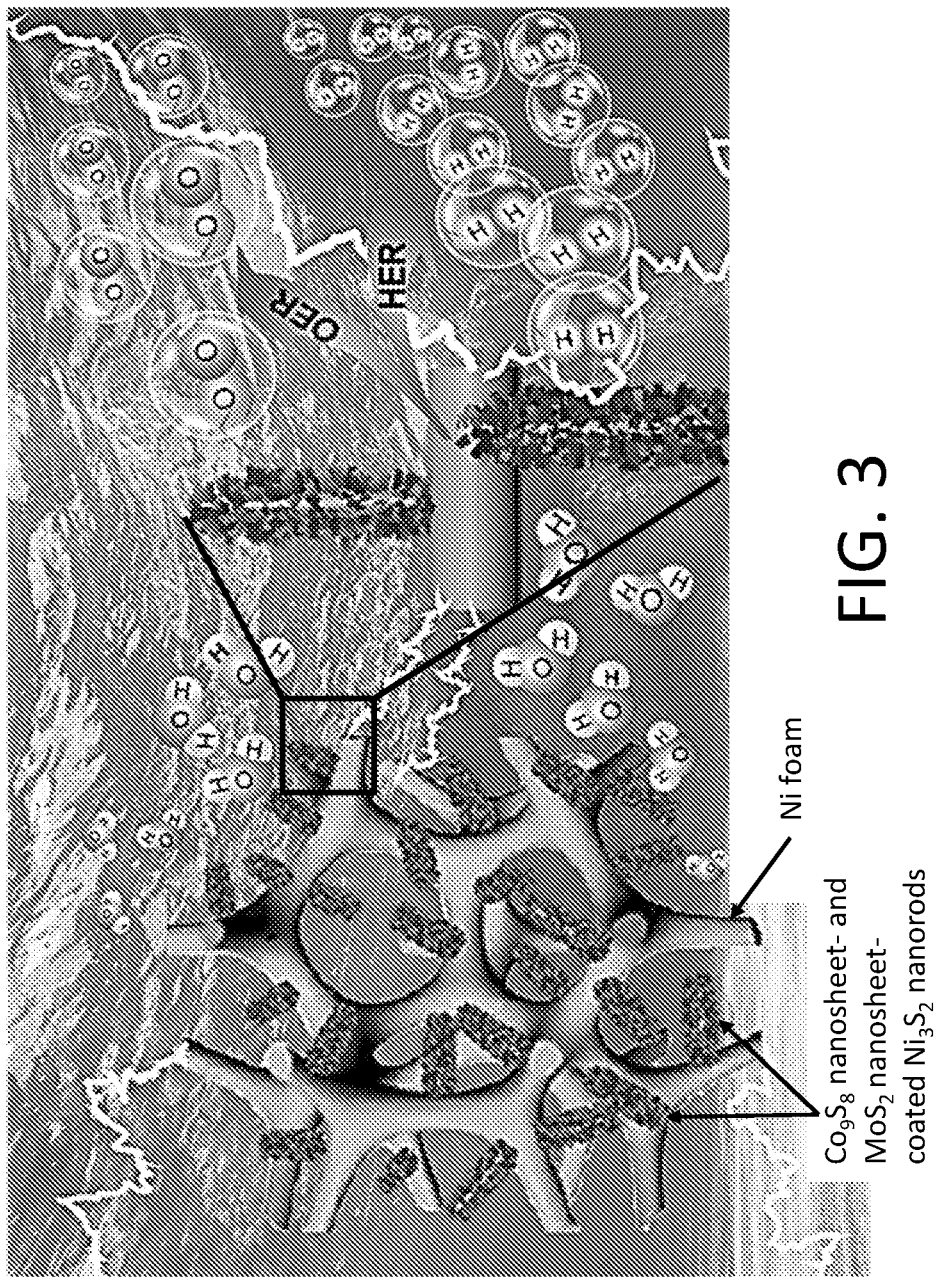
FIG. 3 is a schematic, illustrating the use of CoMoNiS—NF-31 in overall water splitting.

The present composite electrocatalytic materials may be used on their own, combined with other additives (e.g., binders such ionomers, fillers such as conductive carbon), and/or disposed on an underlying substrate to provide an electrode for use in an electrochemical system for catalyzing an electrochemical reaction. In embodiments, the electrochemical reaction is the HER, in which hydrogen ($H_2$) is produced via the electrolysis of water ($H_2O$) and the composite electrocatalytic material may catalyze the reduction of hydrogen ions to $H_2$. In embodiments, the electrochemical reaction is the OER, in which water is oxidized to produce free electrons, free hydrogen ions and oxygen ($O_2$) and the composite electrocatalytic material may catalyze the oxidation of water. In embodiments, the electrochemical reaction is overall water splitting and the composite electrocatalytic material catalyzes both the HER and the OER. Any of these electrochemical reactions may take place in acidic, neutral, or alkaline conditions, i.e., pH from 0 to 14. (See FIG. 3.)

Electrocatalytic systems including the present composite electrocatalytic materials (or electrodes formed thereof) are also provided. The electrochemical system may comprise an electrochemical cell configured to contain a fluid including an electrochemical reactant (e.g., a species to be oxidized to form an oxidation product, a species to be reduced to form a reduction product, or both); an electrode comprising any of the disclosed composite electrocatalytic materials in contact with the fluid; and a counter electrode. The selection of fluid depends upon the particular electrochemical reaction to be catalyzed. For the HER/OER/overall water splitting, the fluid may be an electrolyte solution (e.g., a solution of water and a water-soluble electrolyte). Various materials for the counter electrode may be used (e.g., graphite rod). However, as noted above, at least some embodiments of the disclosed composite electrocatalytic materials may be used for both the working and counter electrodes. The electrodes may be immersed in the fluid and may be in electrical communication with one another. The electrocatalytic system may further include a power source in electrical communication with the working and counter electrodes, the power source configured to apply an electrical potential across the electrodes. Other components may be included, e.g., a membrane separating the electrodes, a collection cell configured to collect the oxidation/reduction product(s) from the electrochemical cell, etc.

Methods of using the present composite electrocatalytic materials (or electrodes or electrochemical systems comprising the materials) to catalyze an electrochemical reaction are also provided. In embodiments, the method includes exposing any of the disclosed composite electrocatalytic materials to a fluid including an electrochemical reactant. The exposure results in the oxidation of the electrochemical reactant (e.g., $H_2O$) at the composite electrocatalytic material-fluid interface to produce an oxidation product (e.g., $O_2$), which may be separated from the fluid and collected. As noted above, in at least some embodiments, the same composite electrocatalytic material may induce the reduction of another electrochemical reactant (e.g., hydrogen ions) at the composite electrocatalytic material-fluid interface to produce a reduction product (e.g., $H_2$), which may also be separated from the fluid and collected.

The present composite electrocatalytic materials may be characterized by their efficiency at catalyzing a particular electrochemical reaction, e.g., the HER/OER/overall water splitting. The efficiency may be provided as the overpotential at about 10 mA/cm² as determined in alkaline pH (about 1 M KOH), neutral pH (about 1 M phosphate buffered saline), or acidic pH (about 0.5 M $H_2SO_4$) and a scan rate of about 5 mV/s. In embodiments, the efficiency (overpotential) for the HER is in the range of about 110 mV to about 200 mV in alkaline pH; in the range of about 115 mV to about 270 mV in neutral pH; in the range of about 100 mV to about 190 mV in acidic pH as determined under these conditions. In embodiments, the efficiency (overpotential) for the OER is in the range of about 160 mV to about 230 mV in alkaline pH; in the range of about 400 mV to about 470 mV in neutral pH; and in the range of about 255 mV to about 350 mV in acidic pH as determined under these conditions. For overall water splitting, the efficiency may be provided as the cell voltage at about 10 mA/cm² as determined in alkaline pH (about 1 M KOH), neutral pH (about 1 M phosphate buffered saline), or acidic pH (about 0.5 M $H_2SO_4$) and a scan rate of about 5 mV/s. In embodiments, the efficiency (cell voltage) for overall water splitting is no more than about 1.54 V in alkaline pH, no more than about 1.80 V in neutral pH, and no more than about 1.45 V in acidic pH as determined under these conditions. Each of these measurements may be carried out as described in the Example, below.

The term "average," when used in reference to dimensions of the components of the electrocatalytic materials, refers to an average value as determined from a representative population. Such average dimensions may be determined from SEM or TEM images, including cross-sectional images.

Example

Introduction

This Example demonstrates a method for achieving a hierarchical structure made of ultrathin $MoS_2$ and $Co_9S_8$ nanosheets (~3 nm) decorating the surfaces of $Ni_3S_2$ nanorods which are directly grown onto 3D porous conductive nickel foam (NF). The NF was present from the beginning of the hydrothermal process. By changing the molar ratios of $CoSO_4 \cdot 7H_2O$ to $Na_2MoO_4 \cdot 2H_2O$ in the reaction, various CoMoNiS—NF-xy composites (x:y means Co:Mo ratios of 5:1, 4:1, 3:1, 2:1, 1:1, 1:2, and 1:3, and S amount is fixed) with controllable morphology and composition were obtained. Because the composites were supported on robust NF, they could be used directly in electrocatalytic reactions. All CoMoNiS—NF-xy composites displayed promising electrocatalytic performance, and the CoMoNiS—NF-31 (Co:Mo ratio is 3:1) exhibited the best catalytic activity. For HER, the CoMoNiS—NF-31 showed very low overpotentials at a current density of 10 mA cm⁻² ($\eta_{10}$) of 103, 117, and 113 mV in acid, neutral and alkaline media, respectively. Also, it exhibited superior OER activity, with extremely low $\eta_{10}$ values of 166, 228, and 405 mV under alkaline, acidic, and neutral solutions, respectively. The overall water splitting displayed low cell voltages of 1.54, 1.45, and 1.80 V to afford a current density of 10 mA cm' in alkaline, acidic, and neutral media, respectively. The CoMoNiS—NF-31 exhibited electrocatalytic performance comparable to or outperforming the vast majority of reported materials. In neutral solution, CoMoNiS—NF-31 possessed better electrocatalytic activity than the commonly used noble metal catalysts such as $RuO_2$ ($RuO_2$ in the same test condition shows an overpotential of 683 mV for OER and a cell voltage of 1.85 V at 10 mA cm⁻²). The superior catalytic activity of the CoMoNiS—NF-xy is very promising for applications in overall water splitting over a wide pH range.

EXPERIMENTAL

Chemicals and Materials. Materials used include: Sodium molybdate dehydrate ($Na_2MoO_4 \cdot 2H_2O$, Tianjin Bodi Chemical Reagent Co., Ltd, 99.0%), Cobalt sulfate heptahydrate ($CoSO_4 \cdot 7H_2O$, Tianjin Damao Chemical Reagent Co., Ltd, 99.5%), thiourea ($CH_4N_2S$, Tianjin Dingshengxin Chemical Reagent Co., Ltd, 99.0%), hydrazine hydrate ($N_2H_4 \cdot H_2O$, Xilong Chemical Co., Ltd, 80%), nickel foam (thickness is 1.6 mm, bulk density is 0.45 g cm⁻³, Shenzhen Tianchenghe Technology Co. Ltd), Nafion solution (Sigma-Aldrich Co., 5 wt %), sodium hypophosphite ($NaH_2PO_2$, Beijing Chemical Reagent Co., Ltd, 99.0%), sulfuric acid ($H_2SO_4$, Sinopharm chemical reagent Co. Ltd, 98.08%), potassium hydroxide (KOH, Beijing Chemical Reagent Co., Ltd, 82.0%). All the materials were used without any further purification.

Synthesis of $MoS_7/Co_9S_8/Ni_3S_2$/NF electrocatalysts. In a typical synthesis, a piece of commercial NF (6 cm×10 cm) was treated with 1 M HCl solution for 20 min to remove the oxide layer on the surface, then washed with deionized water and ethanol in turn. NF was then weighed after it was dried in a vacuum oven. 0.562 g (2 mmol) of $CoSO_4 \cdot 7H_2O$, 0.482 g (2 mmol) of $Na_2MoO_4 \cdot 2H_2O$ and 2 g (26.27 mmol) of $CH_4N_2S$ were dissolved in 33 mL of deionized water and 15 mL of hydrazine hydrate under continuous magnetic stirring. The pretreated NF was immersed into the above-mentioned solution, which was transferred into an 80 mL Teflon-lined stainless-steel autoclave and heated at 200° C. for 24 h. After the reaction was cooled down naturally to room temperature, black colored $MoS_2/Co_9S_8/Ni_3S_2$/NF (denoted as CoMoNiS—NF-11, with Co:Mo molar ratio of 1:1) was obtained and rinsed with deionized water and ethanol several times. The loading amount of catalysts on the NF was measured as 1.79 mg cm⁻² after being dried in vacuum at 50° C. for 12 h.

In addition to the Co:Mo molar ratio of 1:1 (2 mmol:2 mmol), additional electrocatalysts were formed in which the $Na_2MoO_4 \cdot 2H_2O$ amount of 2 mmol (0.482 g) was fixed, while the amount of Co source was varied using Co:Mo molar ratios of 5:1, 4:1, 3:1, and 2:1. Similar hydrothermal procedures were carried out, yielding products denoted as CoMoNiS—NF-51, CoMoNiS—NF-41, CoMoNiS—NF-31, and CoMoNiS—NF-21, respectively. Also, using the fixed amount of 2 mmol $CoSO_4 \cdot 7H_2O$ (0.562 g), the Mo dosage was varied to provide Co:Mo molar ratios of 1:2 and 1:3, generating the products recorded as CoMoNiS—NF-12 and CoMoNiS—NF-13, respectively. As control samples, $MoS_2/Ni_3S_2/NF$, $Co_9S_8/Ni_3S_2/NF$, and $Ni_3S_2/NF$ were synthesized with similar procedures to those of the CoMoNiS—NF-xy, except without the addition of $CoSO_4 \cdot 7H_2O$ and $Na_2MoO_4 \cdot 2H_2O$.

Characterization. X-ray powder diffraction (XRD) patterns of the as-synthesized samples were obtained using a Phillips X'pert ProMPD diffractometer (Cu Kα radiation, λ=1.54056 Å). The thickness of $Co_9S_8$ and $MoS_2$ nanosheets was investigated by atomic force microscopy (AFM) in the tapping mode on a Bruker DI MultiMode-8 system under ambient conditions. The morphologies of the products were inspected using a field emission scanning electronic microscope (FESEM, S-8010, Hitachi) at an acceleration voltage of 10 kV and a high-resolution transmission electron microscope (HRTEM, JEM-2010, JEOL and FEI Technai G2 F20) at an acceleration voltage of 200 kV. X-ray photoelectron spectroscopy (XPS) spectra of the as-obtained samples were collected using an ESCALAB 250Xi spectrometer (Thermo Fisher) with Al-Kα X-ray as the radiation source. The chemical compositions of CoMoNiS—NF-xy were studied by inductively coupled plasma-atomic emission spectroscopy (ICP-AES, Jarrel-ASH, ICAP-9000).

Electrochemical measurements. Electrochemical measurements were performed on the CHI660E electrochemical workstation using a typical three electrode glass cell with a graphite rod as the counter electrode, an Hg/HgO electrode as the reference electrode, and the as-synthesized samples as the working electrode. The mass loadings were determined (data not shown) and ranged from about 1.7 to 1.9 mg/cm$^2$. To make a more reliable comparison, $RuO_2$ and Pt/C were loaded onto NF with the same loading amount as that of CoMoNiS—NF-31 for further electrochemical measurement. The polarization curves were recorded in 1.0 M KOH (pH=13.5), 1.0 M phosphate buffered saline (PBS, pH=7.0), and 0.5 M $H_2SO_4$ (pH=0.5) with a scan rate of 5 mV s$^{-1}$. All of the potentials were converted to the reversible hydrogen electrode (RHE), and all polarization curves were iR-compensated. The 1 M PBS solution was prepared by dissolving 13.61 g $KH_2PO_4$ in 100 mL deionized water and adjusting the pH to 7.0 with 1 M KOH. Electrochemical impedance spectroscopy (EIS) measurements were carried out on a Zahner electrochemical workstation (Germany) in the frequency range of 100 kHz to 0.01 Hz at the given potential with AC amplitude of 5 mV.

Computational Methods. Calculations within the framework of the density functional theory (DFT) with periodic boundary conditions were performed using the VASP program. The PBE exchange-correlation functional and the van der Waals (vdW) interactions described via a pairwise force field using the DFT-D3 method of Grimme were used for all calculations. The projector augmented wave (PAW) method and plane wave basis sets were used with an energy cutoff of 400 eV. Transition metal elements were treated by the PBE+U method with $U_{eff}$=4.4 and 3.0 eV for Co and Mo, respectively. All atoms were allowed to relax during the structure optimization of $MoS_2/Co_9S_8$ slabs. For geometry optimization of slabs with adsorbed molecules, only adsorbed molecules and four top layers of $Co_9S_8$ were relaxed. The total energy converged to 10−5 eV, and the geometry was relaxed until the force on each atom was below 0.03 eV/Å. Overpotentials were calculated using computational hydrogen electrode as described for OER. Bader charge analysis was done to analyze charge populations.

Results and Discussion

Characterization of the as-prepared electrode materials. A series of hierarchical $MoS_2/Co_9S_8/Ni_3S_2/NF$ electrocatalysts were prepared via a one-pot hydrothermal method and adjusting the feeding ratio of Co:Mo ranging from 5:1 to 1:3. The schematic illustration of the synthesis is shown in FIG. 1. The composites are referred to as CoMoNiS—NF-xy, where x and y stand for the relative mole ratio of Co and Mo. The resulting products were first characterized by the XRD technique (data not shown). Three Bragg peaks emerged at 44.5°, 51.8°, and 76.4°, which correspond to the (111), (200), and (220) planes of Ni (JCPDS No. 04-0850). The peaks at 21.7°, 31.1°, 37.8°, 50.1°, and 55.3° were identified as the (101), (110), (003), (211), and (300) planes of the hexagonal $Ni_3S_2$ phase (JCPDS No. 44-1418). The characteristic peaks of $Ni_3S_2$ observed in all as-obtained samples indicated the surface of NF was partially transformed into $Ni_3S_2$ during the hydrothermal treatment. The peaks located at 29.8°, 31.2°, 47.6°, and 52.10 in the $Co_9S_8/Ni_3S_2/NF$ sample and the CoMoNiS—NF-31 sample were assigned to $Co_9S_8$ (JCPDS No. 65-6801), corresponding to the (311), (222), (511), and (440) planes, respectively. The Bragg peaks at 14.4°, 33.1°, 39.7°, and 58.5° in the $MoS_2/Ni_3S_2/NF$ sample and the CoMoNiS—NF-31 sample correspond to the (002), (100), (103), and (110) planes of $MoS_2$ (JCPDS No. 37-1492), respectively. Meanwhile, the atomic ratios of Co and Mo in the CoMoNiS—NF-xy determined with ICP-AES generally agreed with their respective starting ratios (not shown).

Surface morphologies of all samples were analyzed with SEM (not shown). Without the addition of Co and Mo sources, the $Ni_3S_2/NF$ structure was an interconnected, macroporous 3D framework, similar to that of pristine NF. A closer inspection of $Ni_3S_2/NF$ showed a very rough surface, which was in sharp contrast to the smooth surface of the NF itself. After the introduction of the Co precursor, $Ni_3S_2$ nanorod arrays (with diameters of 300-600 nm) were observed on the NF substrate, with $Co_9S_8$ nanosheets uniformly covering the $Ni_3S_2$ nanorods. In the presence of a Mo precursor and a high Co content, the resulting CoMoNiS—NF-51 exhibited a very different structure from $Co_9S_8/Ni_3S_2/NF$, with the nanorods being covered completely by densely aggregated $Co_9S_8$ nanosheets. For a fixed Mo amount but a decreasing Co fraction (e.g., CoMoNiS—NF-41), the aggregation reduced, exposing some of the nanorods' surfaces. With further decreases to the Co fraction (e.g., CoMoNiS—NF-31), the SEM image showed that the $Co_9S_8$ and $MoS_2$ nanosheets were directly grown on $Ni_3S_2$ nanorods, and there were no aggregated nanosheets. The decoration of the nanosheets onto the nanorods enlarged the specific surface area of the system. The morphologies of CoMoNiS—NF-21 and CoMoNiS—NF-11 were almost the same as that of CoMoNiS—NF-31, except for containing fewer nanosheets and shorter nanorods, respectively. At fixed Co content but increasing Mo fraction (e.g., CoMoNiS—NF-12 and CoMoNiS—NF-13), the nanorods gradually transformed into nanobelts. When only a Mo precursor source was used, the as-prepared $MoS_2/Ni_3S_2/NF$ exhibited a structure similar to $Co_9S_8/Ni_3S_2/NF$, but with a slightly larger nanorod diameter (0.6-1 μm) and more nanosheets on the surface of the $Ni_3S_2$ nanorods.

These results clearly indicate that the amount of starting material and the ratio of Mo:Co effectively control the morphology, the number of nanosheets, and the size of the nanorods. CoMoNiS—NF-31 had a modest number of ultrathin nanosheets and the least aggregation, which significantly increased the electrochemically active surface area, exposing more accessible active sites, which is more favorable for electrochemical performance. At the Co:Mo molar ratio of 3:1, reactions were further conducted at reduced times of 8, 12, 16, and 20 h. It was found even within 20 h, the number of nanosheets was not sufficient to cover the nanorods. This confirms that the 24 h is an optimal time to ensure the formation of the catalytically active hierarchical co-assembly.

TEM images (not shown) further revealed the structure of CoMoNiS—NF-31, and that confirmed the nanosheets were densely and firmly grown on the nanorods. High-resolution TEM (HRTEM) images of the nanorod surface revealed lattice fringes with spacings of 0.19 and 0.28 nm, corresponding to the (511) and (222) planes of $Co_9S_8$, respectively. The corresponding selected area electron diffraction (SAED) pattern showed two clear obvious rings matching the (511) and (311) planes of $Co_9S_8$, consistent with the HRTEM results. The HRTEM image of the nanorod itself showed lattice fringes having spacings of 0.29 and 0.41 nm, matching well with the (110) and (101) lattice planes of $Ni_3S_2$. The SAED pattern of $Ni_3S_2$ indicated high crystallinity, in good agreement with the XRD and HRTEM results. The HRTEM image of the nanorod surface also showed lattice fringes calculated of 0.62 and 0.27 nm, which were indexed to the (002) and (100) planes of $MoS_2$. The SAED pattern displayed several bright rings, which were indexed to the (103) and (100) planes of $MoS_2$. TEM images also confirmed the nanosheet-like structure (~3 nm) covering the nanorod surface of CoMoNiS—NF-31. Meanwhile, AFM images and the corresponding line-scan profiles of CoMoNiS—NF-31 (not shown) indicated the thickness of the nanosheets was about 3 nm. These results verify the formation of $Co_9S_8$ and $MoS_2$ ultrathin nanosheets (~3 nm) in contact with one another and on the $Ni_3S_2$ nanorod arrays.

The fabrication process of the 3D hierarchical structure of $Co_9S_8/MoS_2/Ni_3S_2/NF$ is schematically depicted in FIG. 1. First, $HS^-$ ions as active particles were released from thiourea ($NH_2CSNH_2$) (reaction 1). The $Ni_3S_2$ particles generated from the reaction of the $HS^-$ ions with NF grew into nanorods (reaction 2). Meanwhile, the $MoO_4^{2-}$ ions reacted with the $HS^-$ ions to form $MoS_2$ nanosheets (reaction 3). Also, $Co^{2+}$ ions reacted with $HS^-$ to yield the $Co_9S_8$ nanosheets (reaction 4). In the reactions, the $Ni_3S_2$ nanorods acted as the backbone to guide the preferential deposition of $MoS_2$ and $Co_9S_8$ nanosheets. The NF not only worked as a robust support for the nanostructured arrays, but also provided Ni sources for the growth of $Ni_3S_2$ nanorods. The following reactions occurred during the hydrothermal process:

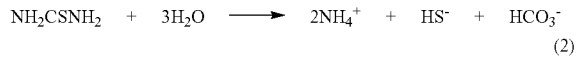
(1)

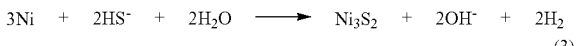
(2)

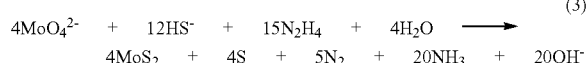
(3)

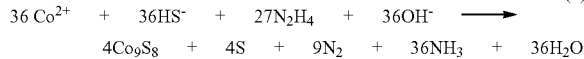
(4)

To better understand the composition and chemical state of the metals in the composites, XPS analysis of CoMoNiS—NF-31 was performed (not shown). The high-resolution XPS spectra of Co 2p for CoMoNiS—NF-31 was divided into two spin-orbit doublets and two shakeup satellites. The two peaks located at 779.9 and 795.1 eV were assigned to the $2p_{3/2}$ and $2p_{1/2}$ core levels of $Co^{3+}$, while two peaks at 781.8 and 796.4 eV originated from the $2p_{3/2}$ and $2p_{1/2}$ core levels of $Co^{2+}$, respectively. Compared with the XPS spectra of $Co_9S_8/Ni_3S_2/NF$ (779.6 and 794.9 eV), the binding energies of Co 2p were up-shifted (~0.3 eV) to 779.9 and 795.1 eV, suggesting a strong interaction between $Co_9S_8$ and $MoS_2$. For the Mo 3d, two obvious peaks located at 229.7 and 232.7 eV were attributed to $Mo^{IV} 3d_{5/2}$ and $Mo^{IV} 3d_{3/2}$, indicating a $Mo^{4+}$ oxidation state of $MoS_2$. Note that the Mo 3d peaks displayed ~1.1 eV down-shifts, compared to $MoS_2/Ni_3S_2/NF$ (230.8 and 233.8 eV), further confirming the strong interaction between $MoS_2$ and $Co_9S_8$. For Ni, the two main peaks at 855.6 and 873.7 eV corresponded to Ni $2p_{3/2}$ and Ni $2p_{1/2}$, respectively. In addition, a small peak at 852.8 eV was observed, belonging to the Ni 2p signal of the NF substrate. For the S 2p, eight peaks were observed, located at 162.1, 162.6, 163.3, 163.8, 164.4, 164.9, 169.2, and 170.7 eV. The two peaks at 162.1 and 163.8 eV were attributed to the S $2p_{3/2}$ and S $2p_{1/2}$ binding energies of $S^{2-}$ in $Co_9S_8$, respectively. Another two peaks at 162.6 and 164.4 eV were assigned to the S $2p_{3/2}$ and S $2p_{1/2}$ binding energies of $S^{2-}$ in $Ni_3S_2$, respectively. The characteristic peaks of S $2p_{3/2}$ and S $2p_{1/2}$ of $S^{2-}$ in $MoS_2$ were located at 163.3 and 164.9 eV, in accordance with the formation of $MoS_2$. Moreover, the peaks at 169.2 and 170.7 eV corresponded to residual sulfate groups or partly oxidized sulphur species due to some surface oxidation. The XPS results not only confirm the successful synthesis of the $Co_9S_8/MoS_2/Ni_3S_2/NF$ composites, but also reveal an electron transfer phenomenon from $Co_9S_8$ to $MoS_2$ through the up-shift of the Co 2p binding energies and the down-shift of the Mo 3d binding energies. A charge transfer process can adjust the frontier orbital energy of metal sulfides, and this could have an effect on the binding energies of intermediates and catalytic rates. First-principles calculations support this experimental observation and suggest that transfer of electrons from $Co_9S_8$ to $MoS_2$ at the interface may be the origin of the observed enhanced performance as will be discussed further below.

Overall Water Splitting Performance in Alkaline pH

HER Activity

To investigate the electrocatalytic activity of the CoMoNiS—NF-xy samples toward overall water splitting, experiments were first carried out in Argon-saturated 1.0 M KOH using a three-electrode system. The composites $Co_9S_8/Ni_3S_2/NF$, $MoS_2/Ni_3S_2/NF$, $Ni_3S_2/NF$, and Pt/C were used as control samples. As summarized in Table A below, the activity trend was: CoMoNiS—NF-31>CoMoNiS—NF-21>CoMoNiS—NF-41>CoMoNiS—NF-51>CoMoNiS—NF-12>CoMoNiS—NF-11>CoMoNiS—NF-13>$MoS_2/Ni_3S_2/NF$>$Co_9S_8/Ni_3S_2/NF$>$Ni_3S_2/NF$ (raw data not shown).

TABLE A

HER performance of all as-prepared samples in different electrolytes.

| Catalysts | $\eta_{10}$ (mA cm$^{-2}$) (1M KOH) | $\eta_{10}$ (mA cm$^{-2}$) (0.5M H$_2$SO$_4$) | $\eta_{10}$ (mA cm$^{-2}$) (1M PBS) |
|---|---|---|---|
| CoMoNiS—NF-51 | 159 | 185 | 267 |
| CoMoNiS—NF-41 | 154 | 177 | 240 |
| CoMoNiS—NF-31 | 113 | 103 | 117 |
| CoMoNiS—NF-21 | 145 | 136 | 142 |
| CoMoNiS—NF-11 | 179 | 173 | 179 |
| CoMoNiS—NF-12 | 174 | 186 | 213 |
| CoMoNiS—NF-13 | 195 | 197 | 218 |
| Co$_9$S$_8$/Ni$_3$S$_2$/NF | 225 | 232 | 330 |
| MoS$_2$/Ni$_3$S$_2$/NF | 203 | 176 | 279 |
| Ni$_3$S$_2$/NF | 236 | 291 | 395 |
| Pt/C | 92 | 88 | 98 |

The Ni$_3$S$_2$/NF exhibited the worst HER activity, suggesting the Ni$_3$S$_2$-containing NF itself (partially-sulfided NF) was not very active for HER. The MoS$_2$/Ni$_3$S$_2$/NF exhibited better HER catalytic activity, with a lower $\eta_{10}$ of 203 mV than Co$_9$S$_8$/Ni$_3$S$_2$/NF ($\eta_{10}$=225 mV).

The CoMoNiS—NF-xy composites exhibited elevated HER activity compared to the control samples, possibly caused by synergetic effects originating from the interfacial areas between the Co$_9$S$_8$ and MoS$_2$ phases. CoMoNiS—NF-31 displayed the best HER performance ($\eta_{10}$=113 mV) among all of the samples, which may be attributed to its well-defined nanostructures with optimally distributed ultrathin nanosheets, scarce aggregation, and largest surface area. The HER activity of CoMoNiS—NF-31 was comparable to the Pt/C catalyst ($\eta_{10}$=92 mV), and much better than those reported for non-noble metal electrocatalysts. An extensive comparison of the HER performance of CoMoNiS—NF-31 with other non-precious electrocatalysts is given in Table 1.

TABLE 1

Comparison of HER performance of CoMoS—NF-31 with other non-precious electrocatalysts.

| Electrolyte | Catalysts | Loading (mg cm$^{-2}$) | $\eta_{2.5}$ (mV) | $\eta_5$ (mV) | $\eta_{10}$ (mV) | References |
|---|---|---|---|---|---|---|
| 1M KOH | CoMoNiS—NF-31 | 1.86 | 51 | 77 | 113 | This Example |
| | Co$_x$Mo$_y$@NC | — | | | 218 | Jiang, J. et al., *J. Mater. Chem. A* 2017, 5, 16929. |
| | Ni$_x$Co$_{3-x}$S$_4$/Ni$_3$S$_2$/NF | 0.56 | | | 136 | Wu, Y. et al., *Nano Energy* 2017, 35, 161. |
| | CoS$_2$ | 1.5 | | | 193 | Ma, X. et al., *Nanoscale* 2018, 10, 4816. |
| | Co$_1$Mn$_1$CH/NF | 5.6 | | | 180 | Tang, T. et al., *J. Am. Chem. Soc.* 2017, 139, 8320. |
| | Ni$_3$S$_2$/NF | — | | | 116 | You, B. et al., *J. Am. Chem. Soc.* 2016. |
| | High-index faceted Ni$_3$S$_2$ nanosheet arrays/NF | 1.6 | | | 223 | Feng, L. L. et al., *J. Am. Chem. Soc.* 2015, 137, 14023. |
| | CoNiP@NF | 1.0 | | | 155 | Han, A. et al., *J. Mater. Chem. A* 2016, 4, 10195. |
| | Co$_9$S$_8$—Ni$_x$S$_y$/NF | 9.0 | | | 163 | Ansovini, D. et al., *J. Mater. Chem. A*, 2016, 4, 9744. |
| | Ni$_3$Se$_2$/NF | 8.87 | | | 203 | Xu, R. et al., *Nano Energy* 2016, 24, 103. |
| | Ni$_{0.7}$Fe$_{0.3}$S$_2$/NF | 3.0 | | | 155 | Zhou, Z. et al., *J. Mater. Chem. A* 2017, 5, 20390. |
| | Cu@CoS$_x$/CF | 3.9 | | | 134 | Liu, Y. et al., *Adv. Mater.* 2017, 29. |
| | S—NiFe$_2$O$_4$/NF | — | | | 138 | Liu, J. et al., *Nano Energy* 2017, 40, 264. |
| 0.1M KOH | CoMoS$_x$ | — | | 200 | — | Staszak-Jirkovsky, J. et al., *Nat. Mater.* 2016, 15, 197. |
| 0.5M H$_2$SO$_4$ | CoMoNiS—NF-31 | 1.86 | 72 | 84 | 103 | This Example |
| | MoB$_2$ | 0.2-0.3 | 230 | — | — | Park, H. et al., *Angew. Chem. Int. Ed.* 2017, 56, 5575. |
| | Au—MoS$_2$ | — | — | — | 120 | Shi, Y. et al., *J. Am. Chem. Soc.* 2015, 137, 7365. |
| | MoS$_2$/hydrogenated graphene | 0.13 | | | 124 | Han, X. et al., *ACS Catal.* 2018, 8, 1828. |
| | Co$_9$S$_8$/NC@MoS$_2$ | 0.28 | | | 117 | Li, H. et al., *ACS Appl. Mater. Interfaces* 2017, 9, 28394. |
| | Co$_9$S$_8$@MoS$_2$/CNFs | 0.21 | | | 190 | Zhu, H. et al., *Adv. Mater.* 2015, 27, 4752. |
| | Ni—Sn@C | 0.1 | | | 350 | Lang, L. et al., *ACS Appl. Mater. Interfaces* 2015, 7, 9098. |
| | Co-NRCNTs | 0.28 | | | 260 | Zou, X. et al., *Angew. Chem. Int. Ed.* 2014, 53, 4372. |
| | Co$_5$Mo$_{1.0}$O | — | | | 173 | Zhang, Y. et al., *Nano Energy* 2018, 45, 448. |
| | MoP-C | 0.84 | | | 136 | Wu, Z. et al., *Nano Energy* 2017, 32, 511. |
| 0.1M HClO$_4$ | CoMoS$_x$ | — | | 210 | | Staszak-Jirkovsky, J. et al., *Nat. Mater.* 2016, 15, 197. |
| | Co$_{0.6}$Mo$_{1.4}$N$_2$ | 0.24 | | | 200 | Cao, B. et al., *J. Am. Chem. Soc.* 2013, 135, 19186. |
| 1.0M PBS | CoMoNiS—NF-31 | 1.86 | 77 | 91 | 117 | This Example |
| | Co$_9$S$_8$/NC@MoS$_2$ | 0.28 | | | 261 | Li, H. et al., *ACS Appl. Mater. Interfaces* 2017, 9, 28394. |
| | S—NiFe$_2$O$_4$/NF | — | | | 197 | Liu, J. et al., *Nano Energy* 2017, 40, 264. |
| | High-index faceted Ni$_3$S$_2$ nanosheet arrays/NF | 1.6 | | | 170 | Feng, L. L. et al., *J. Am. Chem. Soc.* 2015, 137, 14023. |
| | np-CoP NWs/Ti | 2.5 | | | 187 | Pu, Z. et al., *Appl. Catal. B: Environ.* 2016, 196, 193. |
| | WPNAs/CC | 2.0 | | | 200 | Pu, Z. et al., *ACS Appl. Mater. Interfaces* 2014, 6, 21874. |
| | CoNiP@NF | 1.0 | | | 120 | Han, A. et al., *J. Mater. Chem. A* 2016, 4, 10195. |

The Tafel slope of 85 mV dec$^{-1}$ for CoMoNiS—NF-31 (not shown) was much lower than the control samples, implying more favorable kinetics and higher catalytic activity of CoMoNiS—NF-31 toward HER. Moreover, the exchange current density ($j_0$) is an important factor reflecting the number of active sites and indicating the inherent performance of the catalyst. The $j_0$ values are calculated by extrapolating the Tafel plots of all the samples. The $j_0$ value of CoMoNiS—NF-31 was calculated to be 0.65 mA cm$^{-2}$, which is higher than those of Co$_9$S$_8$/Ni$_3$S$_2$/NF (0.17 mA cm$^{-2}$), MoS$_2$/Ni$_3$S$_2$/NF (0.18 mA cm$^{-2}$), and Ni$_3$S$_2$/NF (0.10 mA cm$^{-2}$).

To better understand the HER mechanism, the intrinsic properties of the as-prepared samples were evaluated by performing EIS measurements at an overpotential of 150 mV (not shown). The charge transfer resistance (Rct) is related to the electrocatalytic kinetics at the interface of the electrolyte and electrocatalyst. Generally, a smaller Rct value indicates a faster electron transfer. CoMoNiS—NF-31 delivered a much lower Rct than Co$_9$S$_8$/Ni$_3$S$_2$/NF, MoS$_2$/Ni$_3$S$_2$/NF, and Ni$_3$S$_2$/NF, suggesting a higher electrical conductivity for this hierarchical composite.

OER Activity

OER activities of the as-prepared samples were evaluated in 1.0 M KOH electrolyte. As summarized in Table B, below, the activity trend of the samples was: CoMoNiS—NF-31>CoMoNiS—NF-41>CoMoNiS—NF-51>CoMoNiS—NF-21>Co$_9$S/Ni$_3$S$_2$/NF>CoMoNiS—NF-11>CoMoNiS—NF-12>CoMoNiS—NF-13>MoS$_2$/Ni$_3$S$_2$/NF>Ni$_3$S$_2$/NF. Co$_9$S$_8$/Ni$_3$S$_2$/NF (with only Co and Ni but no Mo) had better OER activity than the composites CoMoNiS—NF-xy (x:y=1:1, 1:2, and 1:3, with higher Mo amount) and MoS$_2$/Ni$_3$S$_2$/NF (without Co). This highlights the higher OER activity of the Co$_9$S$_8$ nanocrystals in alkaline media. The $\eta_{10}$ of 166 mV of CoMoNiS—NF-31 was much lower than the $\eta_{10}$ of Co$_9$S$_8$/Ni$_3$S$_2$/NF (192 mV), MoS$_2$/Ni$_3$S$_2$/NF (239 mV), and Ni$_3$S$_2$/NF (395 mV), and was only 16 mV behind the commercial RuO$_2$ ($\eta_{10}$=150 mV). The OER activity of CoMoNiS—NF-31 was better than other NF-loaded materials. Table 2 shows a detailed comparison of the OER performance of CoMoNiS—NF-31 with other reported non-precious electrocatalysts. The best OER activity of CoMoNiS—NF-31 may be attributed to its optimal morphology, composition, and synergy from heterometallic active sites.

As noted above in the discussion of the XPS spectra, the special nature of the hierarchical CoMoNiS—NF-31 composite enables a charge transfer between the Co$_9$S$_8$ and MoS$_2$ phases. This is a synergistic effect that results in a slightly more reduced Mo in the MoS$_2$ nanosheets and a slightly more oxidized Co in Co$_9$S$_8$ nanocrystals. The enhanced catalytic activity may derive from this charge transfer between the two nanophases.

TABLE B

OER performance of all samples in different electrolytes.

| Catalysts | $\eta_{10}$ (mA cm$^{-2}$) (1M KOH) | $\eta_{10}$ (mA cm$^{-2}$) (0.5M H$_2$SO$_4$) | $\eta_{10}$ (mA cm$^{-2}$) (1M PBS) |
|---|---|---|---|
| CoMoNiS—NF-51 | 188 | 295 | 433 |
| CoMoNiS—NF-41 | 179 | 275 | 419 |
| CoMoNiS—NF-31 | 166 | 255 | 405 |
| CoMoNiS—NF-21 | 212 | 255 | 408 |
| CoMoNiS—NF-11 | 217 | 280 | 451 |
| CoMoNiS—NF-12 | 218 | 307 | 455 |
| CoMoNiS—NF-13 | 228 | 350 | 462 |
| Co$_9$S$_8$/Ni$_3$S$_2$/NF | 192 | 395 | 495 |
| MoS$_2$/Ni$_3$S$_2$/NF | 239 | 525 | 525 |
| Ni$_3$S$_2$/NF | 395 | 569 | 569 |
| RuO$_2$ | 150 | 231 | 683 |

TABLE 2

Comparison of OER performance of CoMoNiS—NF-31 with other reported non-precious electrocatalysts.

| Electrolyte | Catalysts | Loading (mg cm$^{-2}$) | $\eta_{10}$ (mV) | References |
|---|---|---|---|---|
| 1M KOH | CoMoNiS—NF-31 | 1.86 | 166 | This Example |
| | Co$_9$S$_8$@MoS$_2$/CNFs | 0.212 | 430 | Zhu, H. et al., *Adv. Mater.* 2015, 27, 4752. |
| | MoS$_2$/Ni$_3$S$_2$ | 9.7 | 218 | Zhang, J. et al., *Angew. Chem. Int. Ed.* 2016, 55, 6702. |
| | High-index faceted Ni$_3$S$_2$ nanosheet arrays/NF | 1.6 | 260 | Feng, L. L. et al., *J. Am. Chem. Soc.* 2015, 137, 14023. |
| | Co$_x$Mo$_y$@NC | — | 330 | Jiang, J. et al., *J. Mater. Chem. A* 2017, 5, 16929. |
| | CoS$_2$ | 1.5 | 290 | Ma, X. et al., *Nanoscale* 2018, 10, 4816. |
| | Ni$_3$Se$_2$/NF | 8.87 | 239 | Xu, R. et al., *Nano Energy* 2016, 24, 103, 24, 103. |
| | Ni$_{0.7}$Fe$_{0.3}$S$_2$/NF | 3.0 | 198 | Zhou, Z. et al., *J. Mater. Chem. A* 2017, 5, 20390. |
| | FePO$_4$/NF | 0.29 | 218 | Yang, L. et al., *Adv. Mater.* 2017, 29, 1704574, 29. |
| | S—NiFe$_2$O$_4$/NF | — | 267 | Liu, J. et al., *Nano Energy* 2017, 40, 264. |
| | Co$_5$Mo$_{1.0}$O NSs@NF | — | 270 | Zhang, Y. et al., *Nano Energy* 2018, 45, 448. |
| | FeOOH/CeO$_2$ HLNTs-NF | 0.44 | 210 | Feng, J. X. et al., *Adv. Mater.* 2016, 28, 4698. |
| | NC/NiMo/NiMoO$_x$/NF | — | 284 | Hou, J. et al., *Small* 2017, 13. |
| | Co-doped NiO/NiFe$_2$O$_4$ | 4.0 | 186 | Wu, Z. et al., *J. Mater. Chem. A* 2018, 6, 167. |
| | N$_{i2}$P/Ni/NF | — | 200 | You, B. et al., *ACS Catal.* 2016, 6, 714. |
| | NiFe/Ni(OH)$_2$/NiAl foil | — | 246 | Niu, S. et al., *Adv. Sci.* 2017, 4, 1700084. |
| | Fe—Pi/NF | — | 215 | Zhong, D. et al., *J. Mater. Chem. A* 2017, 5, 18627. |

TABLE 2-continued

Comparison of OER performance of CoMoNiS—NF-31 with other reported non-precious electrocatalysts.

| Electrolyte | Catalysts | Loading (mg cm$^{-2}$) | $\eta_{10}$ (mV) | References |
|---|---|---|---|---|
| | NiFe-LDH/NF | — | 240 | Luo, J. et al., *Science* 2014, 345, 1593. |
| | NiCo$_2$S$_4$ NW/NF | — | 260 | Sivanantham, A. et al., *Adv. Funct. Mater.* 2016, 26, 4661. |
| 0.5M H$_2$SO$_4$ | CoMoNiS—NF-31 | 1.86 | 228 | This Example |
| | N-WC/CFP | 10.0 | 220 | Xiong, Q. et al., *Nat. Commun.* 2018, e1801450. |
| | NC-CNT/CoP/CC | 1.3 | 350 | Guan, C. et al., *J. Mater. Chem. A* 2018, 6, 9009. |
| 1.0M PBS | CoMoNiS—NF-31 | 1.86 | 405 | This Example |
| | S—NiFe$_2$O$_4$/NF | — | 494 | Liu, J. et al., *Nano Energy* 2017, 40, 264. |
| | Co—Se—S—O/CC | 2.0 | 480 | Luo, Z. M. et al., *ACS Appl. Mater. Interfaces* 2018, 10, 8231. |

It is noteworthy that CoMoNiS—NF-31 gave a large electrocatalytic current density at a very low overpotential, generating a large current density of 100 mA cm$^{-2}$ at an overpotential of 378 mV. However, further increasing either the Co amount (such as in CoMoNiS—NF-51) or the Mo amount (such as in CoMoNiS—NF-13) led to degraded OER activity. This may be explained by the enhanced aggregation of surplus Co$_9$S$_8$ nanosheets at a high Co fraction, or the transformation to nanobelts from nanorods at high Mo fraction. Similarly, the Tafel plots showed that CoMoNiS—NF-31 had the smallest slope (58 mV dec$^{-1}$), indicating appreciable kinetics for the OER. The outstanding OER performance of CoMoNiS—NF-31 in alkaline solution also improved conductivity (as indicated by its lower Rct) as mentioned above.

HER and OER Simultaneously

As a result of the good HER and OER performance, a two-electrode electrolyzer was constructed using CoMoNiS—NF-31 as the catalyst for both the water reduction and oxidation with 1 M KOH solution as the medium. For comparison, control samples of Co$_9$S$_8$/Ni$_3$S$_2$/NF, MoS$_2$/Ni$_3$S$_2$/NF, and Ni$_3$S$_2$/NF were also used as both cathodic and anodic materials. In addition, commercial electrodes (RuO$_2$ as the anode and Pt/C as the cathode) were evaluated under the same conditions. The polarization curve (not shown) for overall water splitting indicated that a cell voltage of 1.540 V was required to achieve a current density of 10 mA cm$^{-2}$ for CoMoNiS—NF-31, much smaller than those observed in Co$_9$S$_8$/Ni$_3$S$_2$/NF (1.743 V), MoS$_2$/Ni$_3$S$_2$/NF (1.697 V), and Ni$_3$S$_2$/NF (1.786 V), and only 0.014 V (14 mV) higher than that (1.526 V) of precious metals (Pt/C∥RuO$_2$). Table 3 compares the overall water splitting performance of the present CoMoNiS—NF-31 with recently reported materials. The low cell voltage of 1.54 V of CoMoNiS—NF-31 was superior to the values for reported state-of-the-art materials (such as 1.62 V for EG/Ni$_3$Se$_2$/Co$_9$S$_8$, 1.68 V for NiCo$_2$S$_4$ NW/NF and Co$_5$Mo$_{1.0}$PNSs@NF, 1.65 V for Co$_9$S$_8$/WS$_2$/Ti foil, and 1.58 V for Co—MoS$_2$. More importantly, CoMoNiS—NF-31 exhibited greater long-term stability, without obvious degradation of the current density (20 mA cm$^{-2}$) at 1.70 V for nearly 24 h (not shown).

TABLE 3

Comparison of overall water splitting performance for the recently reported materials.

| Electrolyte | Catalysts | Cell voltage at 10 mA cm$^{-2}$ (V) | References |
|---|---|---|---|
| 1M KOH | CoMoNiS—NF-31 | 1.54 | This Example |
| | EG/Ni$_3$Se$_2$/Co$_9$S$_8$ | 1.62 | Hou, Y. et al., *Nano Lett.* 2017, 17, 4202. |
| | Co$_1$Mn$_1$CH | 1.68 | Tang, T. et al., *J. Am. Chem. Soc.* 2017, 139, 8320. |
| | NC-CNT/CoP | 1.63 | Guan, C. et al., *J. Mater. Chem. A* 2018, 6, 9009. |
| | NiCo$_2$S$_4$ NW/NF | 1.68 | Sivanantham, A. et al., *Adv. Funct. Mater.* 2016, 26, 4661. |
| | Co$_9$S$_8$/WS$_2$/Ti foil | 1.65 | Peng, S. et al., *J. Mater. Chem. A* 2017, 5, 23361. |
| | Co—MoS$_2$ | 1.58 | Xiong, Q. et al., *Chem. Commun.* 2018, 54, 3859. |
| | Co$_5$Mo$_{1.0}$PNSs@NF | 1.68 | Zhang, Y. et al., *Nano Energy* 2018, 45, 448. |
| 0.5M H$_2$SO$_4$ | CoMoNiS—NF-31 | 1.45 | This Example |
| | N-WC/CFP | 1.40 | Han, N. et al., *Nat. Communi.* 2018, 9, 924. |
| | NC-CNT/CoP | 1.66 | Guan, C. et al., *J. Mater. Chem. A* 2018, 6, 9009. |
| | Co—MoS$_2$ | 1.90 | Xiong, Q. et al., *Chem. Commun.* 2018, 54, 3859. |
| 1M PBS | CoMoNiS—NF-31 | 1.80 | This Example |
| | S—NiFe$_2$O$_4$/NF | 1.95 | Liu, J. et al., *Nano Energy* 2017, 40, 264. |
| | NC-CNT/CoP | 1.69 | Guan, C. *J. Mater. Chem. A* 2018, 6, 9009. |

The CoMoNiS—NF-31 catalyst was examined with SEM after the HER (cathodic electrode) and OER (anodic electrode) tests (not shown), showing no obvious change in surface morphology. The XPS spectra of CoMoNiS—NF-31 after HER and OER were also examined (not shown). The Co 2p, Mo 3d, Ni 2p, and S 2p spectrum after HER revealed no significant change in the binding energies. Therefore, the outstanding stability of HER electrocatalytic activity can be attributed to high stability of the morphology, structure, and chemical state of CoMoNiS—NF-31. After the OER test, Co 2p and Mo 3d levels showed no obvious change in binding energy. However, for Ni 2p, the peaks of metal Ni disappeared due to the surface oxidation of Ni$^0$ into nickel (oxy)hydroxides during the OER test in alkaline electrolyte.

Nickel (oxy)-hydroxide species on the surface of electrocatalysts is regarded as the active site to enhance OER performance. Furthermore, the intensity of the metal-S bond[0] decreased after OER testing because of partial surface oxidation of CoMoNiS—NF-31, confirming the conversion of metal sulfide into metal (oxy)hydroxides. These metal (oxy)hydroxides species can lead to a remarkable electrocatalytic performance and durability for the OER. The above results demonstrate that CoMoNiS—NF-31 can be used as both HER and OER electrocatalysts in alkaline media with high activity and good stability.

Overall Water Splitting Performance in Acidic pH

HER Activity

CoMoNiS—NF-31 and its counterpart control groups were also investigated as water splitting electrocatalysts in acidic media (0.5 M $H_2SO_4$ solution). All samples required lower overpotentials to drive HER in acid media, due to more favorable kinetics under lower pH. As shown in Table A, the HER activity trend was: CoMoNiS—NF-31>CoMoNiS—NF-21>CoMoNiS—NF-11>$MoS_2$/$Ni_3S_2$/NF~CoMoNiS—NF-41>CoMoNiS—NF-51~ CoMoNiS—NF-12>CoMoNiS—NF-13>$Co_9S_8$/$Ni_3S_2$/NF>$Ni_3S_2$/NF. In acidic media, only some composites were comparable to $MoS_2$/$Ni_3S_2$/NF. Too high Co:Mo ratio (4:1 and 5:1) or too low Co:Mo ratio (1:2 and 1:3) degrades HER performance, suggesting there exists an optimal range of Co/Mo proportions (from 3:1 to 1:1) to ensure good HER activity. The aggregation of $Co_9S_8$ nanosheets at Co-rich ratios and the formation of nanobelts at Mo-rich ratios both decreased HER activity. Specifically, apart from being comparable to Pt/C ($\eta_{10}$=88 mV), CoMoNiS—NF-31 achieved an $\eta_{10}$ of 103 mV, much lower than $Co_9S_8$/$Ni_3S_2$/NF ($\eta_{10}$=232 mV), $MoS_2$/$Ni_3S_2$/NF ($\eta_{10}$=176 mV), $Ni_3S_2$/NF ($\eta_{10}$=291 mV), and other control samples. As shown in Table 1, the performance of CoMoNiS—NF-31 was much better than many reported materials. In addition, the small Tafel slope (55 mV $dec^{-1}$) and Rct (1.1Ω) of CoMoNiS—NF-31 demonstrated enhanced intrinsic activity and conductivity, leading to better HER electrocatalytic ability.

OER Activity

The OER electrocatalytic performance of the samples in acidic media was measured. As shown in Table B, the activity was: CoMoNiS—NF-31>CoMoNiS—NF-21>CoMoNiS—NF-41>CoMoNiS—NF-11>CoMoNiS—NF-51>CoMoNiS—NF-12>CoMoNiS—NF-13>$Co_9S_8$/$Ni_3S_2$/NF>>$MoS_2$/$Ni_3S_2$/NF>$Ni_3S_2$/NF. CoMoNiS—NF-31 retained the best OER electrocatalytic performance, with a very small $\eta_{10}$ of 255 mV. Also, it exhibited the lowest Tafel slope (78 mV $dec^{-1}$) and smallest Rct value (19.4Ω) among all the tested samples.

HER and OER Simultaneously

When using CoMoNiS—NF-31 as the electrocatalyst for overall water splitting in a two-electrode configuration, a very small cell voltage (1.45 V) was observed for reaching a current density of 10 mA $cm^{-2}$ (not shown). As shown in Table 3, the cell voltage was much lower than those reported for Co—$MoS_2$ (1.90 V) and NC—CNT/CoP (1.66V), comparable to N—WC/CFP (1.40 V). The stability of CoMoNiS—NF-31 for overall water splitting in acid, however, was limited (not shown). The current density decreased from 21.7 to 17.4 mA $cm^{-2}$ after 80 min of continuous water splitting at 1.53 V.

Overall Water Splitting Performance in Neutral Conditions

HER Activity

Apart from the alkaline and acidic conditions, the electrocatalytic performance of CoMoNiS—NF-xy and the control samples were also evaluated in neutral media (1 M PBS, pH=7.0). The activity trend was: CoMoNiS—NF-31>CoMoNiS—NF-21>CoMoNiS—NF-11>CoMoNiS—NF-12>CoMoNiS—NF-13>CoMoNiS—NF-41>CoMoNiS—NF-51>$MoS_2$/$Ni_3S_2$/NF>$Co_9S_8$/$Ni_3S_2$/NF>$Ni_3S_2$/NF (Table A). CoMoNiS—NF-31 displayed superior electrocatalytic behavior for HER ($\eta_{10}$=117 mV), exceeding $Co_9S_8$/$Ni_3S_2$/NF ($\eta_{10}$=330 mV), $MoS_2$/$Ni_3S_2$/NF ($\eta_{10}$=279 mV), $Ni_3S_2$/NF ($\eta_{10}$=395 mV) and other CoMoNiS—NF-xy samples. The overpotential (117 mV) of CoMoNiS—NF-31 was even much lower than those of many reported promising materials such as S—$NiFe_2O_4$/NF ($\eta_{10}$=197 mV), np-CoP NWs/Ti ($\eta_{10}$=187 mV), WP NAs/CC ($\eta_{10}$=200 mV) (see Table 1). The lower Tafel slope and Rct (not shown) further verified the better HER activity of CoMoNiS—NF-31.

OER Activity

For OER reactions, the activity was: CoMoNiS—NF-31>CoMoNiS—NF-21>CoMoNiS—NF-41>CoMoNiS—NF-51>CoMoNiS—NF-11>CoMoNiS—NF-12>CoMoNiS—NF-13>$Co_9S_8$/$Ni_3S_2$/NF>>$MoS_2$/$Ni_3S_2$/NF>$Ni_3S_2$/NF. Notably, the overpotential (405 mV) at 10 mA $cm^{-2}$ ($\eta_{10}$) of CoMoNiS—NF-31 was much lower than other promising reported materials, such as S—$NiFe_2O_4$/NF (494 mV) and Co—Se—S—O/CC (480 mV) (see Table 2). More importantly, under a neutral pH environment, the overpotential of 405 mV of a 10 mA $cm^{-2}$ for CoMoNiS—NF-31 was much lower than that of the NF-supported $RuO_2$ (683 mV), demonstrating outstanding OER performance.

Figure 2:
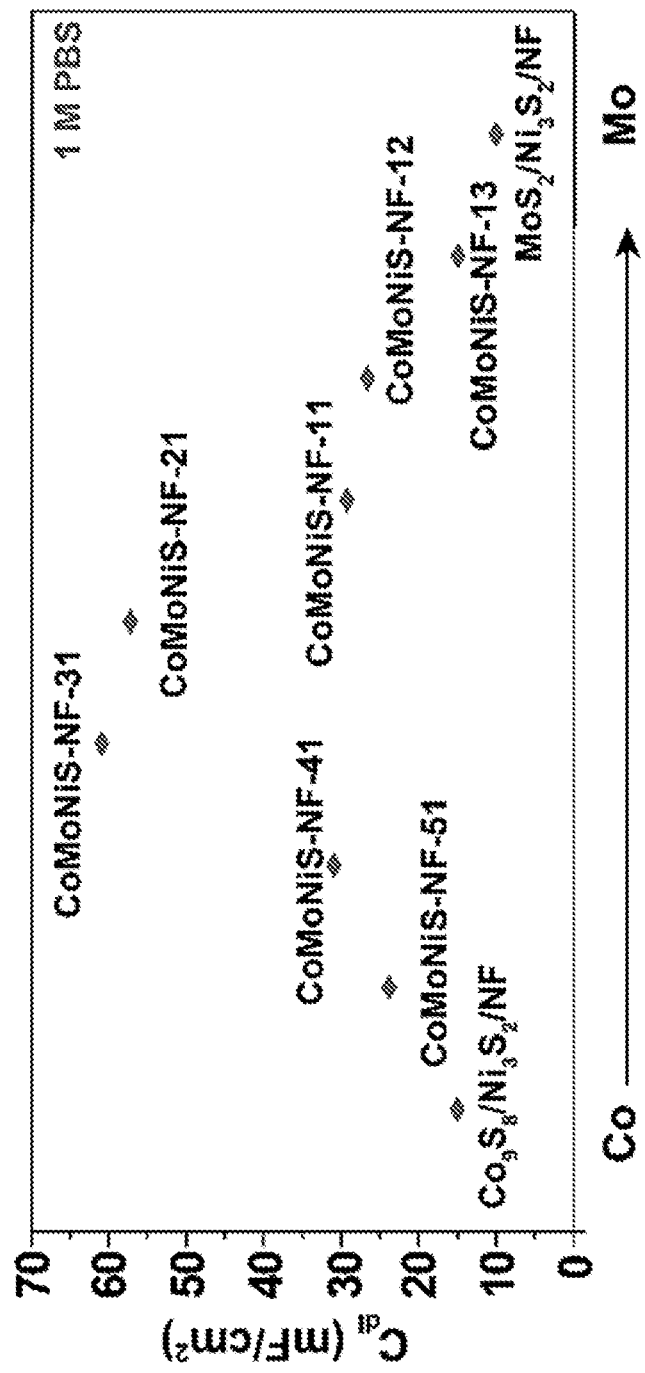
FIG. 2 plots double layer capacitance (Cal) values, showing the influence of Co/Mo ratio in CoMoNiS—NF-xy.

To better understand the outstanding OER performance of CoMoNiS—NF-31, the double layer capacitance (Cal) was measured, which could provide an estimate of the electrochemical surface area (ECSA) of the electrocatalyst. The results are summarized in FIG. 2. The ECSA value for CoMoNiS—NF-31 was 60.9 mF $cm^{-2}$, which was the largest among the control samples. The $C_{dl}$ values increased from 15 mF $cm^{-2}$ for $Co_9S_8$/$Ni_3S_2$/NF to 30.9 mF $cm^{-2}$ for CoMoNiS—NF-41, and climbed to a maximum value of 60.9 mF $cm^{-2}$ for CoMoNiS—NF-31. $C_{dl}$ then decreased to 10 mF $cm^{-2}$ for $MoS_2$/$Ni_3S_2$/NF. This suggests that regulating the Co/Mo ratio is effective in controlling the ECSAs of CoMoNiS—NF-xy. Again, the Tafel slopes and Rct values (not shown) confirmed the favorable structure and chemical properties of CoMoNiS—NF-31 as an electrocatalyst for OER.

HER and OER Simultaneously

Investigations on overall water splitting in neutral pH are rare because of the scarcity of promising electrocatalysts. Because of the high performance of CoMoNiS—NF-31, this investigation was performed. As described above, for overall water splitting, the electrolyzer employed two electrodes (an anode and a cathode), both consisting of CoMoNiS—NF-31 (data not shown). The polarization curve displayed a cell voltage of 1.80 V to deliver a current density of 10 mA $cm^{-2}$, even lower than that (1.85 V) of NF-supported precious metals (Pt/C∥$RuO_2$). More importantly, the present value (1.80 V) was significantly lower than the known high-performing materials of S—$NiFe_2O_4$/NF (1.95 V) and comparable to NC—CNT/CoP (1.69 V). NC—CNT/CoP is a rare example of a material whose overall water-splitting performance has been tested under all-pH conditions, but its cell voltages of 1.63 V in alkaline and 1.66 V in acidic pH were higher than the CoMoNiS—NF-31 material (1.54 V in alkaline and 1.45 V in acid, see Table 3). Furthermore, the CoMoNiS—NF-31 based device showed excellent durability after 20 h at 1.80 V, with negligible degradation of current density (not shown). These results demonstrate that CoMoNiS—NF-31 is a superior electrocatalyst for overall water splitting under pH neutral conditions, and support its use for the splitting of river or ocean water.

The results presented above confirm that, unlike most reported non-noble metal electrocatalyst that can only be used over a narrow pH range, the optimized CoMoNiS—NF-31 hierarchical material can serve as a highly active pH-universal bifunctional electrocatalyst. Three key points are noteworthy: (1) regardless of pH conditions, for HER, $MoS_2$ was always more active than $Co_9S_8$, while for OER, $Co_9S_8$ was more active than $MoS_2$, and the optimized integration of the two metal sulfides can significantly improve the HER and OER performance; (2) For OER, all materials followed an activity trend of alkaline>acidic>neutral; (3) CoMoNiS—NF-31 showed the best electrocatalytic activity, especially in neutral media, with a catalytic performance that remarkably outperforms commercial $RuO_2$.

Balance Between HER/OER Activity and Material Stability

For an electrocatalyst, activity and stability can be understood from the ratio between hydrogen/oxygen production rate (current density, J) and metal dissolution rate during HER/OER (equivalent dissolution current density, S). This activity-stability metric is denoted as the activity-stability factor (ASF) where at a constant overpotential ($\eta$), the best electrocatalyst for the HER/OER would have the highest ASF value. Representative ASF values were calculated for CoMoNiS—NF-xy samples (x:y=2:1, 3:1, and 4:1) evaluated under the same conditions and over broad pH conditions (not shown). Three trends are evident. First, CoMoNiS—NF-31 has the largest ASF, suggesting the best balance between HER/OER activity and stability among these composites. Second, for CoMoNiS—NF-31, in alkaline conditions, the ASF of HER is higher than in acidic and neutral conditions, with an order of HER (base)>HER (neutral)>HER (acid). Third, for OER, the order is OER (base)>OER (neutral)>OER (acid) for the ASF factor. The lower ASF value under acidic conditions than in alkaline and neutral environments may be due to the poor stability under oxidizing potentials in acidic media during OER.

As discussed above, CoMoNiS—NF-31 displays superior electrocatalytic activity in any medium (alkaline, acidic, or neutral) and the synergy between the external phases of $Co_9S_8$ and $MoS_2$ is a main contributor to the activity enhancement. In summary, four key points may be made: (1) Regardless of pH conditions, for HER, $MoS_2$ is always more active than $Co_9S_8$, while for OER, $Co_9S_8$ is more active than $MoS_2$, and the optimized integration of the two metal sulfides can significantly improve the HER and OER performance. (2) For OER, all materials follow an activity trend of alkaline>acidic>neutral. (3) CoMoNiS—NF-31 shows the best electrocatalytic activity, especially in neutral media, remarkably outperforming commercial $RuO_2$. (4) Synergy between the metal sulfides $Co_9S_8$ and $MoS_2$ contributes significantly to the enhanced electrocatalytic activity. The results presented above confirm that, unlike the most non-noble-metal electrocatalysts that are active and stable over a narrow pH range, the optimized CoMoNiS—NF-31 hierarchical material can serve as a highly active and stable pH universal bifunctional electrocatalyst.

First-Principles Calculations

As described above, the co-presence of the two phases of $Co_9S_8$ and $MoS_2$ make a significant main contribution to the improvement in electrocatalytic activity. First-principles calculations were conducted to examine coupling interactions at the interface of $Co_9S_8$ and $MoS_2$. Specifically, DFT calculations were performed in order to address the effect of $Co_9S_8(100)/MoS_2$ interface on the activity of $Co_9S_8$ for the OER reaction. The TEM results (not shown) indicate that the $MoS_2$ interlayer distance is nearly the same as in $MoS_2$ bulk, and the interface orientation between the two phases is non-specific. Therefore, interface stability was calculated depending on $Co_9S_8(100)$ termination and $MoS_2$ orientation (not shown). Specifically, two interface structures were examined, one with $MoS_2$ layers parallel to and one with $MoS_2$ layers normal to the interface with Co-terminated $Co_9S_8$ in order to investigate charge transfer and activity in OER. Calculated charge transfer between $MoS_2$ and $Co_9S_8$ using Bader charges (not shown) indicates an overall strong transfer of electrons from $Co_9S_8$ to $MoS_2$ at the Co terminated interface due to the formation of Co—S bonds across this interface. Calculated density of states (DOS) (not shown) shows a decrease at the Fermi level upon binding of $Co_9S_8$ to $MoS_2$, which indicates that electrons are withdrawn from Co to $MoS_2$. These results are consistent with the XPS results presented above which show the slight oxidation of Co and reduction of Mo in this hierarchical nanocomposite, respectively.

Gibbs free energies of four electrochemical reaction steps for OER ($2H_2O \rightarrow O_2 + 4H^+ + 4e^-$) on the $Co_9S_8$ surfaces of $Co_9S_8(100)/MoS_2$ structures were estimated using calculated O*, OH*, and OOH* intermediates on different surface sites (geometries of adsorbed species, computational methods/details not shown). Without $MoS_2$, formation of O—O bond in OOH* is the rate-limiting step, with calculated overpotential of 1.45 V. The overpotential required for this step decreases dramatically to 0.86 V for the $Co_9S_8/MoS_2$ structure in which $(001)MoS_2$ is perpendicular to $Co_9S_8$ (001), shown in FIG. 10b. By contrast, for the $Co_9S_8/MoS_2$ structure in which $(001)MoS_2$ is parallel to $Co_9S_8(001)$, the rate limiting step changes to the initial OH* adsorption with the overpotential of 0.52 V. While the overpotentials are dependent on pH, the relative values in this approach will show the same trend at all pH values. As $Co_9S_8$ loses electrons to $MoS_2$, the binding energies of adsorbed species change and the overpotential decreases. The experimental results presented above indicate that $Co_9S_8$ activity in OER is strongly dependent on the presence of interfaces to other transition metal sulfides. The calculations also support the experimental results as they suggest that $Co_9S_8/MoS_2$ has enhanced electrochemical activity because of (a) charge transfer from Co to $MoS_2$, (b) the resulting higher oxidation state of Co, and (c) different binding energies of reaction intermediates.

CONCLUSIONS

The hydrothermal process based on nickel foam produces a controllable hierarchical composite structure of ultrathin $Co_9S_8$ and $MoS_2$ nanosheets grown on and coating $Ni_3S_2$ nanorod arrays. This assembly was an effective electrode for HER and OER. The ratio of the $Co_9S_8$ and $MoS_2$ nanosheets and the $Ni_3S_2$ nanorod arrays in the composite could be controlled with no binder being necessary, leading to a composition with more active sites and high electrical conductivity. The optimized CoMoNiS—NF-31 composite was a highly efficient bifunctional electrocatalyst for both HER and OER under alkaline, acidic, and neutral conditions (pH universal). It exhibited extremely low overpotentials of 103, 113, and 117 mV for HER in alkaline, acidic, and neutral media, respectively. For OER in alkaline, acidic, and neutral media, CoMoNiS—NF-31 exhibits a current density of 10 mA cm$^{-2}$ at ultralow overpotentials of 166, 405, and 228 mV, respectively.

The superior electrocatalytic performance of CoMoNiS—NF-31 may be attributed to the following features: (1) intimate contact of 2D active ultrathin nanosheets on nanorod arrays directly grown on a 3D highly conductive substrate NF, enabling the full use of active sites of the electrocatalyst and efficient electron and mass transfer; (2) the synergistic effects of the active metal sulfides of $Co_9S_8$ and $MoS_2$; and (3) complete coverage of the pristine NF surface by the $Co_9S_8$, $MoS_2$, and $Ni_3S_2$, preventing corrosion and enhancing durability of the 3D structures.

This is believed to be the first report of this type of hierarchical structure composed of nanosized transition metal sulfides exhibiting highly efficient and pH-universal bifunctional electrocatalytic performance for overall water splitting.

Other data and information, including information indicated as being "not shown" above, may be found in U.S. Pat. Application No. 62/751,907, which is hereby incorporated by reference in its entirety.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A composite electrocatalytic material for catalyzing water splitting, the material comprising:
   a porous, conductive support composed of a transition metal foam, the support having a surface, and
   a coating on the surface of the support, the coating comprising
   nanorods of a first transition metal chalcogenide, each nanorod anchored on one end to the surface of the support and extending perpendicularly away from the surface of the support to a free opposing end,
   nanosheets of a second transition metal chalcogenide, the nanosheets coating a surface of the nanorods of the first transition metal chalcogenide, and
   nanosheets of a third transition metal chalcogenide, the nanosheets also coating the surface of the nanorods of the first transition metal chalcogenide.

2. The material of claim 1, wherein the nanorods have an average diameter in a range of from 200 nm to 800 nm and an average length in a range of from 1 µm to 5 µm.

3. The material of claim 1, wherein each nanosheet of the second and third transition metal chalcogenides is anchored on one side to the surface of the nanorods and extends perpendicularly away from the surface of the nanorods to a free opposing side.

4. The material of claim 1, wherein the nanosheets of the second and third transition metal chalcogenides have an average thickness of less than 5 nm.

5. The material of claim 1, wherein the nanosheets of the second and third transition metal chalcogenides are in contact with one another so as to undergo electron transfer as determined via X-ray photoelectron spectroscopy.

6. The material of claim 1, wherein the coating on the surface of the support is continuous and the nanosheets of the second and third transition metal chalcogenides form a continuous coating on the surface of the nanorods.

7. The material of claim 1, wherein the first, second, and third transition metal chalcogenides are selected from different transition metal sulfides.

8. The material of claim 7, wherein the transition metals of the different transition metal sulfides are selected from Ni, Mo, W, Co, and Fe.

9. The material of claim 7, wherein the different transition metal sulfides are nickel sulfide, cobalt sulfide, and molybdenum sulfide.

10. The material of claim 7, wherein the first transition metal chalcogenide is nickel sulfide, the second transition metal chalcogenide is cobalt sulfide, and the third transition metal sulfide is molybdenum sulfide.

11. The material of claim 10, wherein cobalt and molybdenum are present at a ratio of 3:1.

12. The material of claim 1, wherein the transition metal foam is nickel foam, the first transition metal chalcogenide is $Ni_3S_2$, the second transition metal chalcogenide is $Co_9S_8$, the third transition metal chalcogenide is $MoS_2$ and $Co_9S_8$ and $MoS_2$ are present at a ratio of 3:1.

13. An electrocatalytic system for catalyzing water splitting, the system comprising an electrochemical cell configured to contain water, an electrode comprising the material of claim 1 in contact with the water, a counter electrode in electrical communication with the electrode, and a power source in electrical communication with the electrode and the counter electrode and configured to apply an electrical potential across the electrode and the counter electrode.

14. The system of claim 13, wherein the counter electrode also comprises the material of claim 1.

15. A method of making the material of claim 1, the method comprising exposing the porous, conductive support to an aqueous solution comprising a first precursor comprising a chalcogen, a second precursor comprising a first transition metal, and a third precursor comprising a second transition metal at an elevated temperature, under pressure, and for a period of time to induce chemical reactions of the first precursor with the support to form the nanorods of the first transition metal chalcogenide, chemical reactions of the first precursor with the second precursor to form the nanosheets of the second transition metal chalcogenide, and chemical reactions of the first precursor with the third precursor to form the nanosheets of the third transition metal chalcogenide.

16. A method of using the system of claim 13, the method comprising applying the electrical potential across the electrode and the counter electrode to induce an oxidation reaction at the electrode to produce $O_2$ or a reduction reaction at the electrode to produce $H_2$.

17. The method of claim 16, wherein the counter electrode also comprises the material of claim 1 and the applied electrical potential induces the oxidation reaction at the electrode and the reduction reaction at the counter electrode.

18. The method of claim 17, wherein the $O_2$ and $H_2$ are produced at acidic pH, neutral pH, and basic pH.

19. The method of claim 18, wherein the system is characterized by a cell voltage at each pH of no more than 1.80 V at 10 $mA/cm^2$ and a scan rate of 5 mV/s.

* * * * *